(12) United States Patent
Pichel

(10) Patent No.: US 8,944,754 B2
(45) Date of Patent: Feb. 3, 2015

(54) GAS-TURBINE ENGINE WITH BLEED-AIR TAPPING DEVICE

(75) Inventor: Sacha Pichel, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 372 days.

(21) Appl. No.: 13/468,461

(22) Filed: May 10, 2012

(65) Prior Publication Data

US 2012/0288359 A1 Nov. 15, 2012

(30) Foreign Application Priority Data

May 12, 2011 (DE) .......................... 10 2011 101 331

(51) Int. Cl.
| | | |
|---|---|---|
| F01D 17/10 | (2006.01) | |
| F01D 17/12 | (2006.01) | |
| F02C 9/18 | (2006.01) | |
| F04D 27/02 | (2006.01) | |
| F02C 6/08 | (2006.01) | |
| F02C 7/052 | (2006.01) | |

(52) U.S. Cl.
CPC .............. *F02C 9/18* (2013.01); *F04D 27/0207* (2013.01); *F02C 6/08* (2013.01); *F02C 7/052* (2013.01); *F05D 2250/41* (2013.01); *F05D 2260/602* (2013.01); *F05D 2260/607* (2013.01); *F05D 2260/606* (2013.01)
USPC ............ 415/145; 415/121.2; 60/782; 60/785; 60/226.1

(58) Field of Classification Search
CPC .............. F02C 9/18; F02C 7/052; F02C 6/08; F04D 27/0207; F04D 27/0215; F05D 2260/606; F05D 2260/607; F01D 17/105; F01D 17/141; F01D 17/143
USPC ......... 415/144, 145, 121.2, 157, 158; 60/782, 60/785, 226.1, 226.3
See application file for complete search history.

(56) References Cited

U.S. PATENT DOCUMENTS

| | | | |
|---|---|---|---|
| 3,588,268 A | * | 6/1971 | Hampton ...................... 415/145 |
| 4,679,982 A | * | 7/1987 | Bouiller et al. ............... 415/145 |
| 5,044,153 A | | 9/1991 | Mouton |
| 5,054,286 A | | 10/1991 | Stransky et al. |
| 5,845,482 A | | 12/1998 | Carscallen |

(Continued)

FOREIGN PATENT DOCUMENTS

| | | |
|---|---|---|
| EP | 0298015 | 1/1989 |
| EP | 0374004 | 6/1990 |

(Continued)

OTHER PUBLICATIONS

European Search Report dated Feb. 5, 2014 from counterpart app No. 12003440.0.

(Continued)

*Primary Examiner* — Christopher Verdier
(74) *Attorney, Agent, or Firm* — Timothy J. Klima; Shuttleworth & Ingersoll, PLC

(57) ABSTRACT

A gas-turbine engine with at least one compressor and at least one bleed-air tapping device, which includes an annular duct in a radially outer wall of a flow duct, and with an annular closing element, which is arranged in the region of the annular duct and can be moved in a substantially axial direction from a closed position to an open position, with the closing element having an annular flow divider projection which in the open position projects in the flow duct.

9 Claims, 3 Drawing Sheets

(56) References Cited

Figure 1:
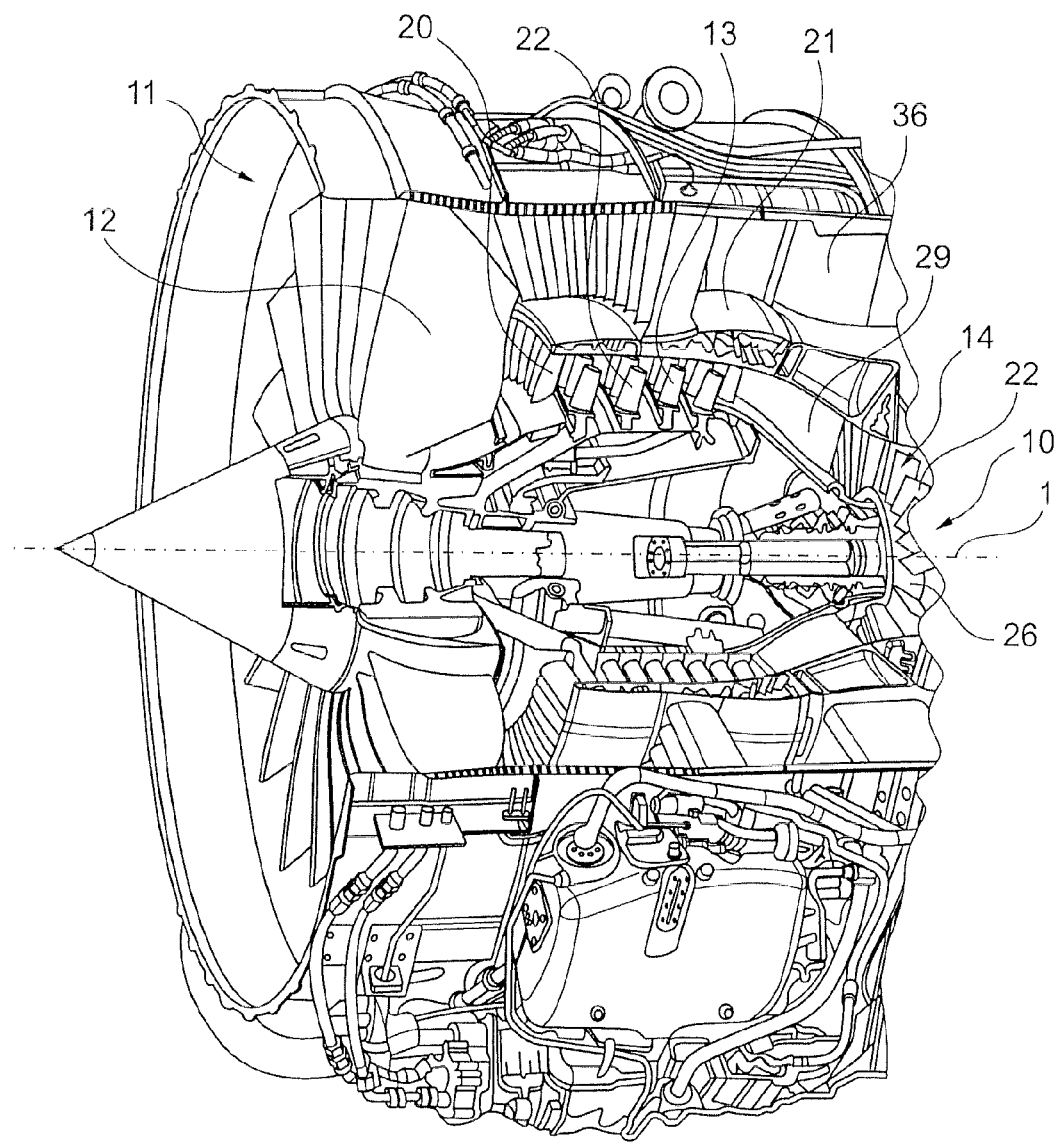

U.S. PATENT DOCUMENTS 7,785,066 B2 8/2010 Bil et al.
2008/0063515 A1 3/2008 Bil et al.

FOREIGN PATENT DOCUMENTS

| EP | 1865184 | 12/2007 |
| FR | 2926328 | 7/2009 |
| GB | 2047815 | 12/1980 |

OTHER PUBLICATIONS

German Search Report dated Jan. 26, 2012 from counterpart application.

* cited by examiner

GAS-TURBINE ENGINE WITH BLEED-AIR TAPPING DEVICE

This application claims priority to German Patent Application DE102011101331.1 filed May 12, 2011, the entirety of which is incorporated by reference herein.

This invention relates to a gas-turbine engine with at least one compressor and at least one bleed-air tapping device.

It is known from the state of the art that in the area of compressors bleed air is tapped, for example in order to vary the mass flow through the compressor and to optimize the compressor with regard to its aerodynamic stability.

It is furthermore known to discharge, by means of bleed air, particles entering the gas-turbine engine, for example dust, ice particles, water droplets or the like. The bleed air is here discharged into a bypass duct of the gas-turbine engine.

It is furthermore known from the state of the art either to provide individual bleed-air tapping openings or to design an annular duct extending around the circumference and provided inside the casing of the compressor. When an annular duct is used, however, it proves to be a disadvantage that the cross-section through the installation space between the compressor stages is limited and that the tapping opening is, due to the construction, aligned axially and hence predominantly parallel to the flow. This leads to a comparatively small unobstructed cross-section perpendicular to the flow, as a result of which the discharge of particles from the flow through the core engine in particular is not optimally assured.

When individual valves or similar are used for singular bleed-air tapping openings, this has the disadvantage that a large number of components is needed to operate them, making the entire construction complicated, cost-intensive and unfavourable as regards weight. In addition, complex embodiments of this type are more prone to faults.

The object underlying the present invention is to provide a gas-turbine engine having a bleed-air tapping device where said bleed air-tapping device is of simple and dependable design and permits reliable discharge of particles that have entered the engine.

It is a particular object of the present invention to provide solution to the above problems by a combination of the features described hereinof claim 1. Further advantageous embodiments of the present invention become apparent from the present description.

In accordance with the invention, a gas-turbine engine is thus provided which has at least one compressor and at least one bleed-air tapping device. The bleed-air tapping device is designed such that it includes an annular duct in a radially outer wall of a flow duct. It is thus possible to discharge bleed air into the annular duct spread around the entire circumference. It is thus assured that particles entering the engine can be discharged over the entire circumferential region. Furthermore, it is provided in accordance with the invention that an annular closing element is used which is arranged in the region of the annular duct. The annular closing element can be moved in a substantially axial direction from a closed position to an open position. Since only a single annular closing element is required, the drive of this closing element can in accordance with the invention be designed particularly simple and impervious to faults. This reduces the manufacturing costs, the overall weight is lower, and the error potential is diminished.

The annular closing element can therefore in accordance with the invention be moved from a closed position to an open position. In the closed position, the bleed-air tapping device is in accordance with the invention substantially closed and/or ineffective despite a slight dead volume remaining which does not impair the flow through the annular duct.

In the open position, a flow divider projection provided on the closing element is advanced into the flow duct. This flow divider projection is designed annularly in accordance with the invention. It thus leads to a flow division and routes a radially outer part of the flow into the bleed-air tapping device. By suitable dimensioning and design of the bleed-air tapping device and of the flow duct, it is possible to discharge dependably and effectively a predetermined mass flow and the particles it contains.

Since the particles entering the engine (dust, ice particles, rain droplets or the like) collect in a radially outer region of the flow duct due to the centrifugal force of an upstream fan and/or the compressor rotors, these particles can be dependably discharged by the bleed-air tapping device.

It is particularly favourable if the flow duct in the region of the bleed-air tapping device is aligned in the radial direction at an angle to a centric engine axis. As a result, the flow passing through the flow duct is deflected radially inwards and the unobstructed tapping cross-section perpendicular to the flow is increased. This in turn leads to the particles to be discharged collecting in the radially outer region of the flow cross-section of the flow duct and thus dependably reaching the bleed-air tapping device. This design furthermore creates the simple possibility of inserting the flow divider projection (flow guide element) into the cross-section of the flow duct by axial movement against the flow direction.

The bleed-air tapping device in accordance with the invention can be arranged behind a stator of a compressor, preferably of a pre-compressor. This results in a low space requirement for the bleed-air tapping device.

Alternatively, it is also possible to arrange the flow divider projection of the bleed-air tapping device such that it is disposed behind a compressor rotor in the flow direction. The additional centrifugal force of the rotor leads here to the accumulation of the particles to be discharged at the radially outer edge area of the flow duct. Here too the discharge of the particles is improved.

The closing element provided in accordance with the invention and/or the flow divider projection can be provided in a preferred manner with sealing means in order to provide suitable seals in the open and/or closed position.

Figure 2:
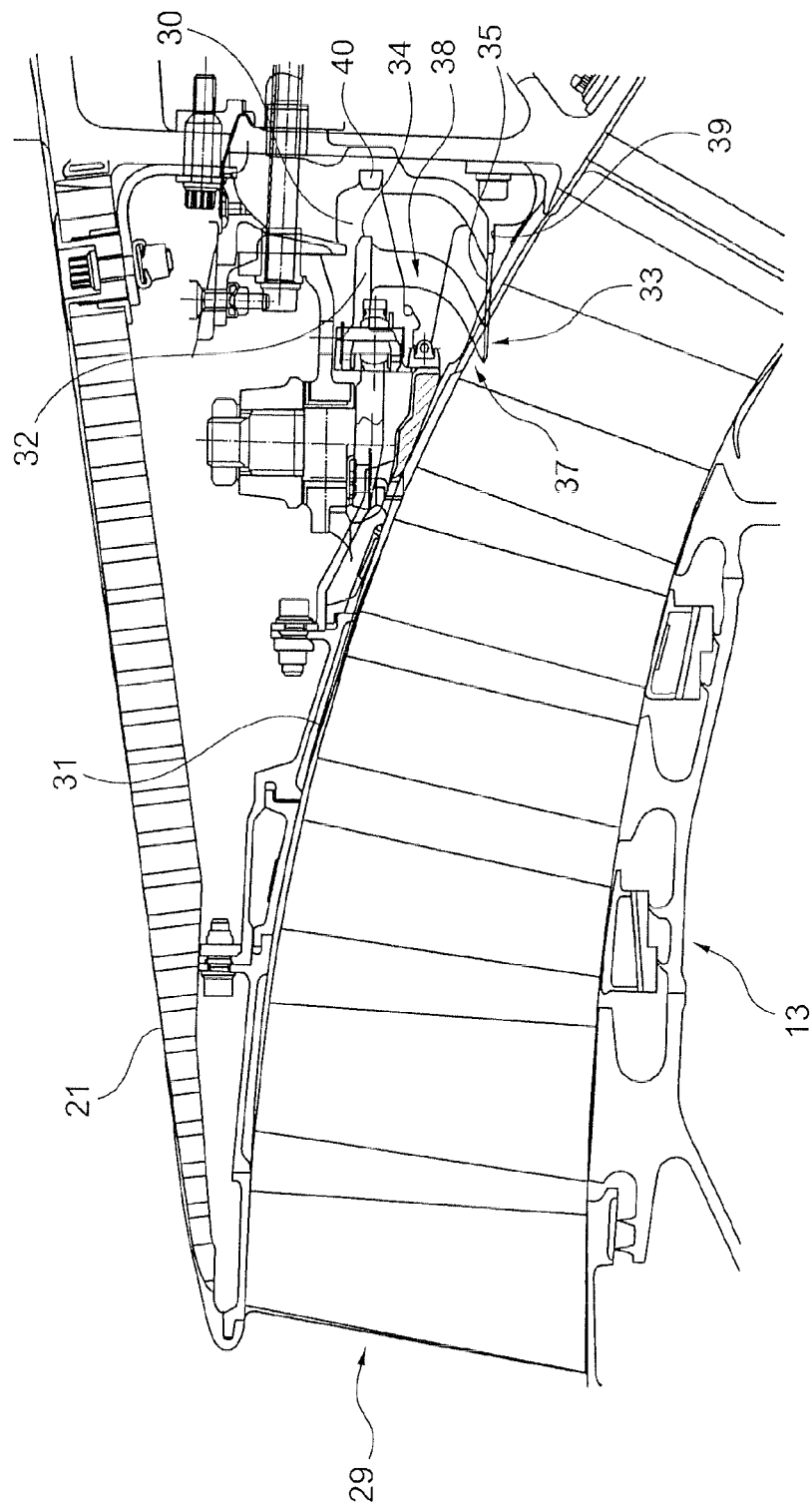
Figure 3:
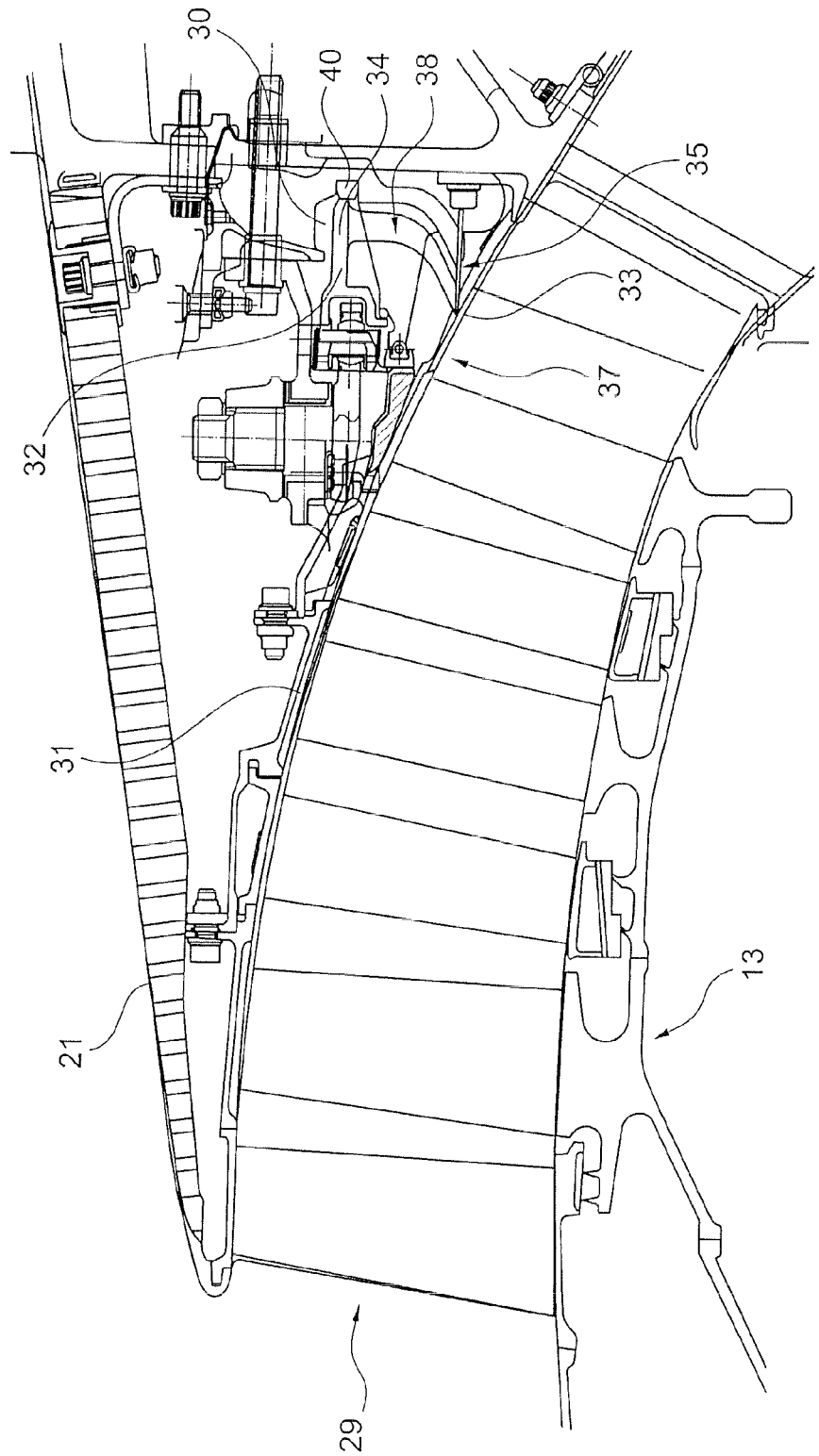

The present invention is described in the following in light of the accompanying drawings, showing a preferred embodiment. In the drawings, FIG. 1 shows a schematic representation of a gas-turbine engine in accordance with the present invention, FIG. 2 shows a detail view of a bleed-air tapping device in the open position, and FIG. 3 shows a representation of the bleed-air tapping device in the closed position.

FIG. 1 shows a schematic representation of a gas-turbine engine in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers, a high-pressure turbine, an intermediate-pressure turbine and a low-pressure turbine as well as an exhaust nozzle, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs of the high-pressure turbine or the intermediate-pressure turbine, respectively.

The turbine sections have similar stages, including an arrangement of fixed stator vanes projecting radially inwards from the casing 21 into the annular flow duct through the turbines, and a subsequent arrangement of turbine blades projecting outwards from a rotatable hub. The compressor drum or compressor disk 26 and the blades 22 arranged thereon, as well as the turbine rotor hub and the turbine rotor blades arranged thereon rotate about the engine axis 1 during operation.

FIGS. 2 and 3 show in an enlarged representation an annular flow duct 29 in the area of a compressor 13, for example of a pre-compressor. The flow duct 29 is delimited radially outwards by a wall 31 which forms part of the engine casing 21.

The bleed-air tapping device in accordance with the invention includes an inlet opening 37 provided in annular form in the wall 31 and issuing into an annular duct 30.

In the region of the annular duct 30 or of the inlet opening 37, respectively, an annular closing element 32 is arranged that is moveable in the axial direction relative to the engine axis 1 from a closed position (FIG. 3) to an open position (FIG. 2). The closing element 32 can for example be driven hydraulically or by a servo-motor via an electric drive.

An annular flow divider projection 33 is attached to the annular closing element 32 by means of several struts 38 spread around the circumference. The flow divider projection 33 is, as shown in FIGS. 2 and 3, designed as a flat ring and guided inside an annular slot 39. This ensures in both the closed and the open position that that region of the flow divider projection 33 which is at the rear in the flow direction prevents any unwelcome inflow into the annular duct 30. That region of the flow divider projection at the rear in the flow direction thus forms a sealing element 35 interacting with the annular slot 39.

To close off the bleed-air tapping device in the closed position, the closing element 32 has on its rear side in the flow direction a sealing element 34 which can be placed into a groove 40.

The closing element 32 can be arranged downstream of the compressor 13, either downstream of stator vanes or downstream of rotor blades. With the arrangement downstream of stator vanes, it is possible in the open position to insert the struts 38 into the spaces between individual stator vanes in order to save on axial installation space.

With the embodiment in accordance with the invention, an improved and dependable discharge of particles is achieved. Overall, the bleed-air tapping device in accordance with the invention is of simple and operationally dependable design and ensures reliable tapping of bleed air besides the discharge of particles.

LIST OF REFERENCE NUMERALS

1 Engine axis
10 Gas-turbine engine
11 Air inlet
12 Fan rotating inside the casing
13 Intermediate-pressure compressor/pre-compressor
14 High-pressure compressor
20 Guide vanes
21 Engine casing
26 Compressor rotor blades
29 Compressor drum or disk
30 Flow duct
31 Annular duct
32 Wall
33 Closing element
34 Flow divider projection
35 Sealing element
36 Sealing element
37 Bypass duct
38 Inlet opening
49 Strut
39 Annular slot
40 Groove

What is claimed is:

1. A gas-turbine engine, comprising:
at least one compressor including a flow duct, and
at least one bleed-air tapping device, which includes:
an annular duct in a radially outer wall of the flow duct, and
an annular closing element, which is arranged in a region of the annular duct and is movable in a substantially axial direction from a closed position blocking passage from the flow duct through the annular duct to an open position permitting passage from the flow duct through the annular duct, the closing element including an annular flow divider projection which projects into the flow duct in the open position.

2. The gas-turbine engine in accordance with claim 1, wherein the flow duct in a region of the bleed-air tapping device angles toward an engine axis with respect to a direction of flow in the flow duct.

3. The gas-turbine engine in accordance with claim 1, and further comprising an annular sealing element arranged downstream of a leading edge of the flow divider projection.

4. The gas-turbine engine in accordance with claim 1, wherein the closing element includes sealing mechanism.

5. The gas-turbine engine in accordance with claim 1, and further comprising a pre-compressor, wherein the bleed-air tapping device is arranged in a region of or downstream of the pre-compressor.

6. The gas-turbine engine in accordance with claim 1, and further comprising a bypass duct, wherein the annular duct issues into the bypass duct.

7. The gas-turbine engine in accordance with claim 1, and further comprising a plurality of struts positioned around a circumference of the engine attaching the flow divider projection to the annular closing element, wherein, in the open position, the struts are positioned in spaces between individual stator vanes of the engine.

8. The gas-turbine engine in accordance with claim 1, and further comprising a compressor having a stator and a rotor, wherein the bleed-air tapping device is arranged behind the stator or the rotor.

9. The gas-turbine engine in accordance with claim 1, and further comprising a sealing component in an area of the wall of the flow duct, wherein the closing element is engageable with the sealing component.

* * * * *